(12) United States Patent
Kim et al.

(10) Patent No.: US 11,575,121 B2
(45) Date of Patent: *Feb. 7, 2023

(54) ELECTRODE MIXTURE MANUFACTURING METHOD AND ELECTRODE MIXTURE

(71) Applicant: LG Chem, Ltd., Seoul (KR)

(72) Inventors: Ki Tae Kim, Daejeon (KR); Chang Wan Koo, Daejeon (KR); Sang Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 420 days.

This patent is subject to a terminal disclaimer.

(21) Appl. No.: 16/604,801

(22) PCT Filed: Sep. 27, 2018

(86) PCT No.: PCT/KR2018/011435
§ 371 (c)(1),
(2) Date: Oct. 11, 2019

(87) PCT Pub. No.: WO2019/066497
PCT Pub. Date: Apr. 4, 2019

(65) Prior Publication Data
US 2020/0168895 A1    May 28, 2020

(30) Foreign Application Priority Data

Sep. 29, 2017   (KR) .......................... 10-2017-0128263

(51) Int. Cl.
*H01M 4/36*        (2006.01)
*H01M 4/04*        (2006.01)
(Continued)

(52) U.S. Cl.
CPC ......... *H01M 4/362* (2013.01); *H01M 4/0435* (2013.01); *H01M 4/0471* (2013.01);
(Continued)

(58) Field of Classification Search
CPC .. H01M 4/362; H01M 4/0435; H01M 4/0471; H01M 4/139; H01M 4/623;
(Continued)

(56) References Cited

U.S. PATENT DOCUMENTS 10,276,855 B2    4/2019  Uchida et al.
2004/0086774 A1*  5/2004  Munoz .................. H01M 12/06
                                                      204/280

(Continued)

FOREIGN PATENT DOCUMENTS

CN    102484243 A    5/2012
CN    103891012 A    6/2014
(Continued)

OTHER PUBLICATIONS

International Search Report from Application No. PCT/KR2018/011435 dated Mar. 13, 2019, 2 pages.

(Continued)

*Primary Examiner* — Andrew J. Oyer
(74) *Attorney, Agent, or Firm* — Lerner, David, Littenberg, Krumholz & Mentlik, LLP

(57) ABSTRACT

The present invention provides: an electrode mixture manufacturing method comprising the processes of introducing a first binder, an electrode active material, and a conductive material into an extruder, performing a first mixing of the first binder, the electrode active material, and the conductive material in the extruder, additionally introducing a second binder into the extruder and performing a second mixing, and yielding an electrode mixture resulting from the first mixing and the second mixing; an electrode mixture manufactured thereby; and an electrode manufacturing method using the electrode mixture.

9 Claims, 2 Drawing Sheets

(51) Int. Cl.
*H01M 4/139* (2010.01)
*H01M 4/62* (2006.01)
*H01M 10/052* (2010.01)

(52) U.S. Cl.
CPC .......... *H01M 4/139* (2013.01); *H01M 4/623* (2013.01); *H01M 10/052* (2013.01)

(58) Field of Classification Search
CPC ......... H01M 10/052; H01M 2004/027; H01M 2004/028; H01M 4/622; H01M 4/1391; H01M 4/1393; H01M 4/0404; H01M 4/043; H01M 4/13; H01M 4/04; H01M 4/624; Y02E 60/10
See application file for complete search history.

(56) References Cited

U.S. PATENT DOCUMENTS

| | | | |
|---|---|---|---|
| 2010/0021819 A1* | 1/2010 | Zhamu | H01M 4/587 429/231.8 |
| 2012/0009331 A1 | 1/2012 | Kwon et al. | |
| 2014/0170454 A1 | 6/2014 | Kwon et al. | |
| 2014/0377652 A1 | 12/2014 | Lim et al. | |
| 2015/0303481 A1* | 10/2015 | Duong | H01G 9/0425 429/217 |
| 2016/0340476 A1 | 11/2016 | Sonntag et al. | |
| 2017/0098818 A1 | 4/2017 | Cheng et al. | |
| 2017/0125815 A1 | 5/2017 | Amin-Sanayei et al. | |
| 2017/0309970 A1 | 10/2017 | Kim et al. | |
| 2020/0321599 A1 | 10/2020 | Kim et al. | |

FOREIGN PATENT DOCUMENTS

| | | |
|---|---|---|
| CN | 106463267 A | 2/2017 |
| CN | 107004858 A | 8/2017 |
| CN | 107134578 A | 9/2017 |
| CN | 110476282 A | 11/2019 |
| EP | 3595052 A2 | 1/2020 |
| JP | H08106897 A | 4/1996 |
| JP | 2000123879 A | 4/2000 |
| JP | 2000149954 A | 5/2000 |
| JP | 4059556 B2 | 3/2008 |
| JP | 2015133302 A | 7/2015 |
| JP | 2015138611 A | 7/2015 |
| JP | 201762960 A | 3/2017 |
| KR | 20140122500 A | 10/2014 |
| KR | 20160146648 A | 12/2016 |
| KR | 20170016859 A | 2/2017 |
| KR | 20170028978 A | 3/2017 |

OTHER PUBLICATIONS

Ludwig, Brandon et al., "Solvent-free Manufacturing of Electrodes for Lithium-ion Batteries", Scientific Reports, Mar. 2016, vol. 6, Article No. 23150, Inner pp. 1-10.
Extended European Search Report including Written Opinion for Application No. EP18860027.4 dated May 13, 2020.
Chinese Search Report for Application No. 201880024726.5 dated Jan. 29, 2022, 3 pages.

* cited by examiner

【Fig. 3】
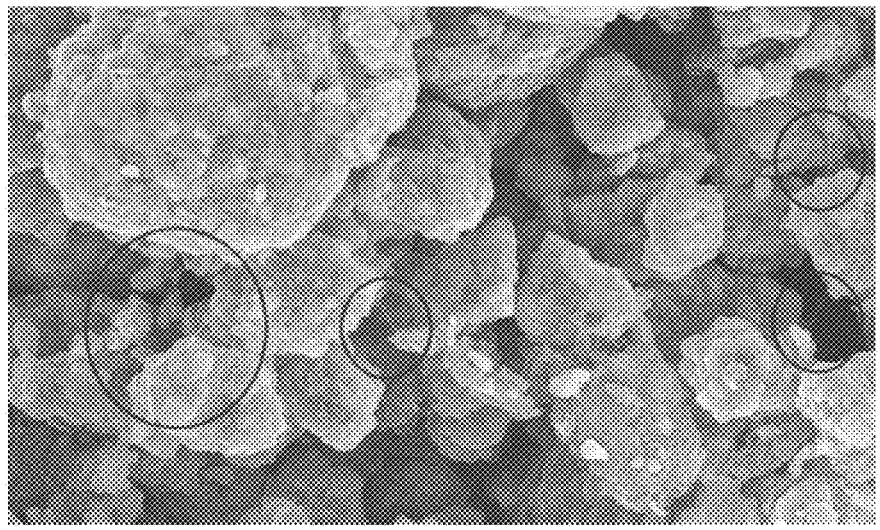
【Fig. 4】
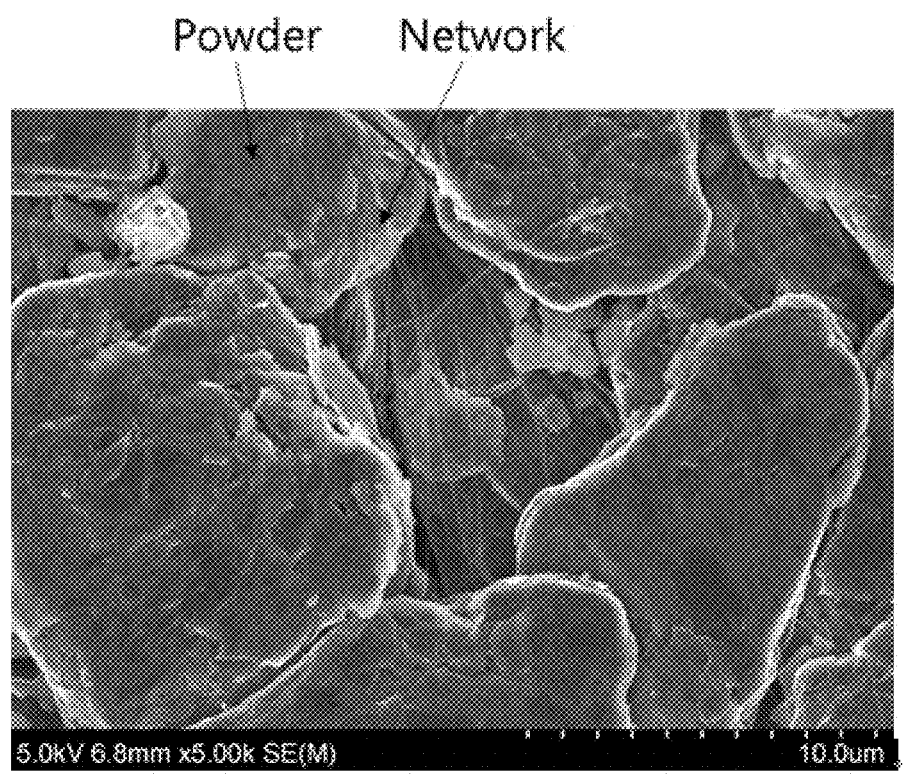

ELECTRODE MIXTURE MANUFACTURING METHOD AND ELECTRODE MIXTURE

CROSS-REFERENCE TO RELATED APPLICATIONS

The present application is a national phase entry under 35 U.S.C. § 371 of International Application No. PCT/KR2018/011435, filed Sep. 27, 2018, which claims priority from Korean Patent Application No. 10-2017-0128263, filed Sep. 29, 2017, the disclosures of which are incorporated herein by reference in their entirety.

TECHNICAL FIELD

The present invention relates to a method for manufacturing an electrode mixture and a method for forming an electrode mixture.

BACKGROUND ART

Lithium secondary batteries have been used not only as energy sources for mobile devices but also as power sources for electric vehicles (EVs) and hybrid electric vehicles (HEVs) in recent years. In addition, they are also used as assist power sources by using grids.

The manufacturing process of such a lithium secondary battery is roughly classified into an electrode process, an assembly process, and an activation process. The electrode process may be divided into an active material mixing process, an electrode coating process, a drying process, a rolling process, a slitting process, and a winding process.

Among them, the active material mixing process is a process of mixing a coating material for forming an electrode active layer in which an actual electrochemical reaction takes place at an electrode. Specifically, the active material mixing process is to a process of manufacturing in the form of a slurry having fluidity by mixing an electrode active material, which is an essential element of the electrode, with a conductive material and filler which are other additives, a binder for adhesion between particles and adhesion of a current collector, and a solvent for imparting viscosity and dispersing particles.

The composition thus mixed for forming the electrode active layer may be referred to as an electrode mixture in a broad sense.

Thereafter, an electrode coating process for applying the electrode mixture onto the electrically conductive current collector and a drying process for removing the solvent contained in the electrode mixture are performed, and the electrode is further rolled to a predetermined thickness.

On the other hand, as the solvent contained in the electrode mixture is evaporated during the drying process, defects such as pinholes and cracks may be induced in the pre-formed electrode active layer.

In addition, since the inside and the outside of the active layer are not uniformly dried, there may be a gap with the relatively later dried portion as the particles at the earlier dried portion float, i.e., due to the particles floating according to the difference in the solvent evaporation rate, thereby deteriorating the quality of the electrode.

In order to solve the above problems, a drying device capable of controlling the evaporation rate of the solvent while allowing the inside and outside of the active layer to be uniformly dried has been considered, but these drying devices are very expensive and require considerable cost and time for operation, and have poor manufacturing processability.

Therefore, there is a high need for a technology capable of improving the manufacturing processability of the electrode.

DISCLOSURE

Technical Problem

It is an object of the present invention to solve the above-mentioned problems of the prior art and the technical problems required from the past.

Specifically, an object of the present invention is to provide an electrode mixture which does not contain a solvent and which does not require a separate drying process. Another object of the present invention is to provide a method for manufacturing an electrode mixture without a solvent.

Technical Solution

In order to achieve the above object, the present invention provides a method of manufacturing an electrode mixture for a secondary battery.

Specifically, it is a method for manufacturing an electrode mixture for a secondary battery, the method including:

a process of injecting a first binder, an electrode active material and a conductive material into an extruder;

a first mixing process of mixing the first binder, the electrode active material and the conductive material in the extruder;

a second mixing process of further adding a second binder to the extruder; and a process of obtaining an electrode mixture derived from the first mixing process and the second mixing process;

That is, the method according to the present invention is a method in which the first binder and the second binder are charged stepwise, and the binding of the electrode active material and the conductive materials, which are components of the mixture, is stepwise induced, to thereby achieve adhesion to each other in a dispersed state.

In addition, since the electrode material mixture is prepared without using a solvent, it is possible to realize a mixture having little fluidity, and in the case of such an electrode material mixture, it is easy to handle and can be processed in desired forms to be used in manufacturing various forms of electrodes.

In addition, if the electrode mixture prepared by the method of the present invention is used in the production of electrodes, the drying process for removing the solvent can be omitted, so that the method of the present invention can solve the fundamental problem about improving the manufacturability of the electrode.

In one specific example, in the first mixing process, first particles which are electrode active materials, second particles which are conductive materials, and granular first powders which are generated as the first particles and/or the second particles are attached to the first binder are produced.

In the second mixing process, the second binder may be fiberized to form a network physically connecting the first powders.

In other words, the first powder and the second particles are combined to constitute the first powder, and the first powders dispersed in the first mixing process are coupled to or connected to the network during the second mixing process, from which it can be seen that each particle exists in a sufficiently dispersed state. As a result, it is possible to form a lump-shaped electrode mixture having a solid content of 100%.

In addition, one of the characteristics of the present invention is to produce an electrode material mixture using an extruder, and in particular, a shearing stress due to the extruder is formed in a second binder so that a plurality of short fibers can form a network, and at this time, the short fibers may be connected to the first binder, directly to the first powder, or to both the first binder and the first powder.

Thus, since the method of the present invention causes a network from the second binder and allows the first powders to be congealed, one lump is formed without a solvent, so it is possible to manufacture an electrode mixture of 100% solids, and the electrode mixture can be easily handled and processed as explained above.

In summary, the method according to the present invention is completely different from the conventional technology using a solvent. Instead of using a dispersion and a viscosity imparting scheme using a solvent, the already dispersed first powder is connected using a network formed by fiberization of the second binder and an electrode mixture having almost no fluidity is manufactured.

In one specific example, the second binder may be polytetrafluoroethylene (PTFE), and the first binder may be one or more selected from polyethylene oxide (PVDF), polyvinylidene fluoride (PVdF), and polyvinylidene fluoride-co-hexafluoropropylene (PVdF-HFP).

The content of the second binder may be between 0.8% and 1%, and more specifically between 0.9% and 1%, based on the total weight of the mixture bulk.

The content of the first binder may be between 2.1% and 2.4%, and more specifically be 2.1% or 2.4%, based on the total weight of the mixture bulk.

In one specific example, the electrode active material may be a positive electrode active material. Herein, in the first and second mixing and kneading processes, the extruder may be operated at a temperature of 20 to 60 degrees Celsius, at 30 rpm to 70 rpm with the maximum torque of 180 NM. At this time, PVdF-HFP (polyvinylidene fluoride-co-hexafluoropropylene) may be used as the first binder, and polytetrafluoroethylene (PTFE) may be used as the second binder.

In the case of a positive electrode, the content of the first binder may be between 2.1% and 2.2%, more specifically be 2.1% of the total weight of the mixture bulk.

In addition, the content of the second binder in the positive electrode may be between 0.8% and 1%, and more specifically be 0.9% of the total weight of the mixture bulk.

If the content of the binders is out of the range, in the extruder, the extruder may be stopped with excessive fiberification of the binders.

When the content of the second binder is less than 0.8%, since sufficient fiberization is not performed, cohesiveness to maintain the shape of the mixture bulk is not present, and if the content exceeds 1%, excessive fiberization of the second binder causes the over torque, thereby making it difficult to obtain a mixture bulk.

The positive electrode active material may be a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (herein, x is between 0 and 33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Lithium nickel oxide expressed by $LiNi_{1-x}M_xO_2$ (herein, M=Co, Mn, Al, Cu, Fe, Mg, B or Ga, and x=0.01 to 0.3); and a lithium manganese compound oxide expressed by $LiMn_{2-x}M_xO_2$ (where M=Co, Ni, Fe, Cr, Zn or Ta, and x=0.01 to 0.1) or $Li_2Mn_3MO_8$ (where M=Fe, Co, Ni, Cu or Zn); $LiMn_2O_4$ in which a part of Li is substituted with an alkaline earth metal ion; disulfide compounds; $Fe_2(MoO_4)_3$, etc., but not limited thereto.

The electrode active material may also be a negative electrode active material. Herein, in the first and second mixing and kneading processes, the extruder may be operated at a temperature of 80 to 120 degrees Celsius, at 30 rpm to 70 rpm with the maximum torque of 80 NM.

In the preparation of the negative electrode, a PVdF-HFP (polyvinylidene fluoride-co-hexafluoropropylene) alone may be used as the first binder, or in some cases, a mixture of polyethylene oxide (PVDF) and polyvinylidene fluoride-co-hexafluoropropylene (PVdF-HFP) may be used as the first binder.

Here, PEO and PVdF-HFP can be mixed in a ratio of 1:9 to 9:1, specifically 2:8 to 8:2, more specifically 4:6 to 6:4.

The second binder may be polytetrafluoroethylene (PTFE) alone.

In the case of a negative electrode, the irreversibility due to the fibrous second binder may be increased, so the content of the second binder should be particularly carefully checked.

Accordingly, in the present invention, the content of the second binder may be between 0.9% and 1%, and more specifically be 1% of the total weight of the mixture bulk.

The content of the first binder may be between 2.3% and 2.4%, and more specifically be 2.4% of the total weight of the mixture bulk.

Examples of the negative electrode active material include carbon such as non-graphitized carbon and graphite carbon; metal complex oxide such as $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, groups 1, 2, and 3 of the periodic table, halogen; $0 < x \leq 1$; $1 \leq y \leq 3$; $1 \leq z \leq 8$); lithium alloy; silicon alloy; tin alloy; metal oxides such as SnO, $Sno_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material may typically be added in an amount of 1 to 30 wt % based on the total weight of the mixture. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

In some cases, a filler, which is a component for suppressing the expansion of the electrode, may be further added in the first mixing process or the second mixing process. The filler is not particularly limited as long as it is a fibrous material without causing a chemical change in the battery, and examples thereof include olefin polymers such as polyethylene and polypropylene; and fibrous materials such as glass fibers and carbon fibers.

The processing of the above-mentioned form means, for example, that the obtained electrode mixture is transformed into a desired shape such as a wound shape, a wave shape, a film shape, etc. In one example thereof, a process of rolling a mixture, obtained through the above process, in a film form having an average thickness of 1 micrometer to 100 micrometers may be further included.

In order to achieve the above object, the present invention also provides an electrode material for forming an electrode for a secondary battery.

The electrode mixture includes a first binder, a second binder, an electrode active material, and a conductive material, The first binder forms a first powder by bonding first particles as an electrode active material, second particles as a conductive material and the first particles and/or second particles, The second binder forms a network in a form of short fibers, and the first powders are physically connected to the network.

Namely, since the electrode mixture according to the present invention does not contain a solvent, it is easy to handle due to its low fluidity, and can be processed into a desired shape and used in various types of electrodes. In addition, if the electrode mixture of the present invention is used in the production of an electrode, the drying process for removing the solvent can be omitted, thereby significantly improving the processability of the manufacturing of the electrode.

In the electrode mixture, the first powders connected to the network may form an integral body, and the integral body may be in the form of an irregular lump or a film rolled with a regular thickness.

This is because the network derived from the second binder is entangled with the first powders so that the form of one lump can be maintained and, on the basis thereof, it can be processed in the form of a film.

In one specific example, the second binder may be polytetrafluoroethylene (PTFE).

In one specific example, the first binder may be one or more selected from the group consisting of polyethylene oxide (PVDF), polyvinylidene fluoride (PVdF) and polyvinylidene fluoride-co-hexafluoropropylene (PVdF-HFP), and more specifically a mixture of polyethylene oxide (PEO) and PVdF-HFP (polyvinylidene fluoride-co-hexafluoropropylene), or PVdF-HFP alone.

Here, PEO and PVdF-HFP can be mixed in a ratio of 1:9 to 9:1, specifically 2:8 to 8:2, more specifically 4:6 to 6:4.

The content of the second binder may be between 0.8% and 1%, and more specifically between 0.9% and 1%, based on the total weight of the mixture bulk.

The content of the first binder may be between 2.1% and 2.4%, and more specifically be 2.1% or 2.4%, based on the total weight of the mixture bulk.

If the content of the binders is out of the range, in the extruder, the extruder may be stopped with excessive fiberification of the binders.

When the content of the second binder is less than 0.8%, since sufficient fiberization is not performed, cohesiveness to maintain the shape of the mixture bulk is not present, and if the content exceeds 1%, excessive fiberization of the second binder causes the over torque, thereby making it difficult to obtain a mixture bulk.

The electrode active material may be a positive electrode active material or a negative electrode active material, and examples of the electrode active material may be those described in the above. Similarly, the materials described in the above can also be used as the conductive material.

The present invention also provides a method of manufacturing an electrode including the electrode mixture.

The method specifically includes: a process in which an electrode mixture in the form of a film is placed on a conductive metal current collector; and a process of applying heat and pressure to the electrode mixture or the metal current collector to laminate each other.

Herein, the process of lamination may include rolling the attached electrode mixture to a predetermined thickness.

The current collector is not particularly limited as long as it has high conductivity without causing a chemical change in the battery. For example, the current collector may be made of a metal such as stainless steel, aluminum, nickel, titanium, sintered carbon, cooper, or aluminum or stainless steel of which the surface is treated with carbon, nickel, titanium, or silver, or the like. The current collector may have fine irregularities on the surface thereof to increase the adhesion of the positive electrode active material, and various forms such as a film, a sheet, a foil, a net, a porous body, a foam, and a nonwoven fabric are possible.

As described above, in the electrode mixture according to the present invention and the method of manufacturing an electrode using the same, the drying process can be omitted, thereby significantly improving the manufacturing processability.

Advantageous Effects

As described above, the method for manufacturing an electrode mixture according to the present invention is characterized in that a network is formed by fiberization of a second binder instead of a solvent, so it is easy to handle and be processed into a desired shape to thereby be used in manufacturing various forms of electrodes.

In addition, since the electrode mixture according to the present invention does not contain a solvent, it is easy to handle due to its low fluidity, and can be processed into a desired shape and used in various types of electrodes. In addition, if the electrode mixture of the present invention is used in the production of an electrode, the drying process for removing the solvent can be omitted, thereby significantly improving the processability of the manufacturing of the electrode.

BRIEF DESCRIPTION OF THE DRAWINGS

FIG. 3 is a photograph of the electrode mixture of Example 1 observed with a scanning electron microscope.

FIG. 4 is a photograph of the electrode mixture of Example 2 observed with a scanning electron microscope.

DETAILED DESCRIPTION OF THE PREFERRED EMBODIMENTS

Hereinafter, the present invention will be described with reference to embodiments thereof, but it should be understood that the scope of the present invention is not limited thereto.

Example 1

Among the total weight of the electrode mixture, 94% by weight of a lithium-transition metal composite oxide including nickel, manganese and cobalt, 3% by weight of Denka black and 2.1% by weight of PVDF-HFP were charged into a Rheomix 300™ extruder of Thermo. Then the mixing is performed at 40 degrees C. for about 5 minutes at a maximum torque of 180 NM and 50 rpm. Then PTFE corresponding to 0.9% by weight among the total weight of the already injected materials was added and the mixture was further mixed for about 10 minutes to obtain an electrode mix.

Example 2

Among the total weight of the electrode mixture, 95.6% by weight of graphite, 1% by weight of Denka black and 2.4% by weight of PVDF-HFP were charged into a Thermo Rheomix 300™ extruder. Then the mixing was performed at 100 degrees C. at a maximum torque of 80 NM and 50 rpm. Then PTFE corresponding to 1% by weight among the total weight of already injected materials was added and the mixture was further mixed for about 10 minutes to obtain an electrode mixture.

Comparative Example 1

An electrode mixture was prepared in the same manner as in Example 1, except that 2.5% by weight of PVDF-HFP and 0.5% of PTFE were added.

Experimental Example 1

Figure 1:
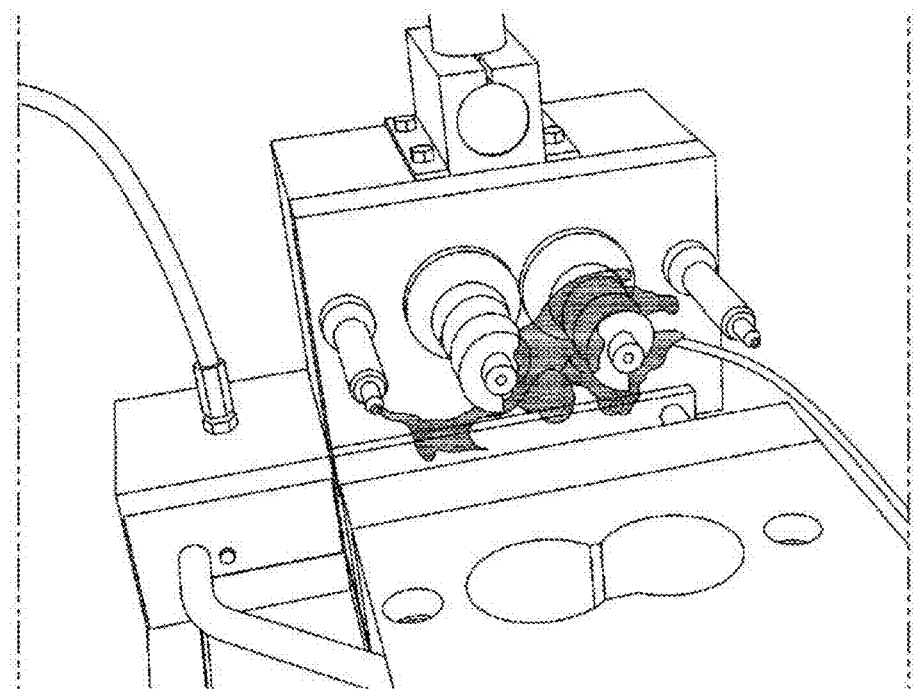
FIG. 1 is an actual photograph of an electrode mixture prepared in Example 1.
Figure 2:
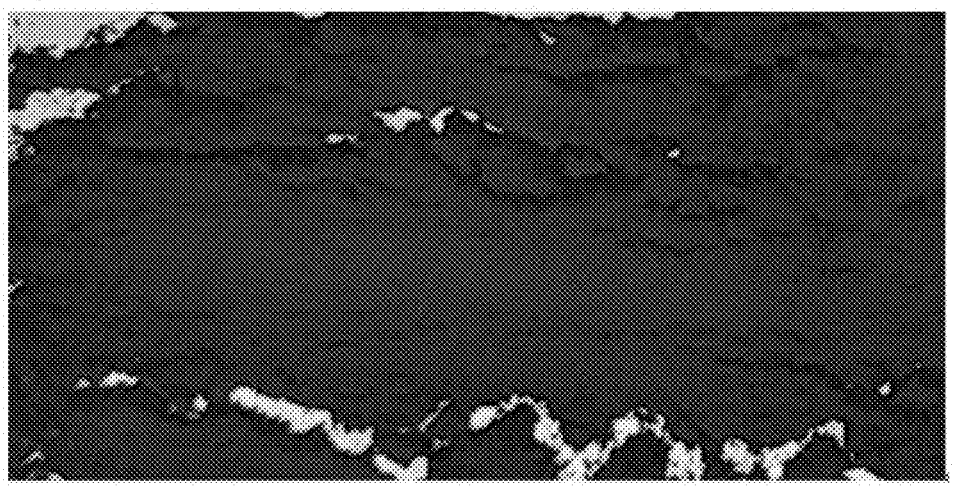
FIG. 2 is an actual photograph of the electrode mixture prepared in Comparative Example 1.

The shapes of the electrode assemblies prepared in Example 1 and Comparative Example 1 were visually compared, and the resulting photographs are shown in FIGS. 1 and 2, respectively.

In the case of FIG. 1, which is a result of Example 1, it can be seen that the electrode mixture is obtained in the form of a lump in which the electrode mixture is fully aggregated.

In the case of FIG. 2, which is a result of Comparative Example 1, it can be seen that the electrode mixture is incomplete and not agglomerated. This is presumably due to the fact that due to the relatively small amount of the second binder, fibrosis to bind the electrode active materials is not sufficiently formed, and therefore the cohesive force is not inherent enough to form a certain shape of the electrode mixture.

Experimental Example 2

The electrode mixture obtained in Example 1 was observed through a scanning electron microscope and the result is shown in FIG. 3.

Referring to FIG. 3, in the case of the electrode mixture obtained in the examples, it can be confirmed that the fibrous PTFE forms the network (circle) and binds the powders.

Experimental Example 3

The electrode mixture obtained in Example 2 was observed through a scanning electron microscope and the result is shown in FIG. 4.

Referring to FIG. 3, in the case of the electrode mixture obtained in the examples, it can be confirmed that the fibrous PTFE forms the network and binds the powders.

While the present invention has been described with reference to examples, it is to be understood that the invention is not limited to the examples, but is intended to cover various modifications and equivalent arrangements included within the spirit and scope of the appended claims.

The invention claimed is:

1. A method for manufacturing an electrode mixture for a secondary battery, comprising:
   injecting a first binder, an electrode active material and a conductive material into an extruder;
   a first mixing process of mixing the first binder, the electrode active material and the conductive material in the extruder;
   a second mixing process of further adding a second binder to the extruder; and
   obtaining an electrode mixture derived from the first mixing process and the second mixing process;
   wherein a content of the first binder is from 2.1% to 2.4% based on a total weight of the electrode mixture, and
   wherein a content of the second binder is from 0.8% to 1% based on the total weight of the electrode mixture.

2. The method of claim 1, wherein:
   the first mixing process comprises: generating a granular first powder as a first particle and/or a second particle is attached to the first binder,
   wherein the first particle is formed of the electrode active material and the second particle is formed of the conductive material; and
   the second mixing process comprises: a network physically connecting the first powder as the second binder becomes fibrous.

3. The method of claim 2, wherein the granular first powder is dispersed in the first mixing process and is bonded to the network during the second mixing process to form a lump of electrode mixture having a solid content of 100%.

4. The method of claim 3, wherein a plurality of short fibers form the network as shear stress is formed in the second binder by the extruder, and
   wherein the plurality of short fibers are connected to the first binder and/or are connected directly to the granular first powder.

5. The method of claim 1, wherein the second binder is polytetrafluoroethylene (PTFE).

6. The method of claim 1, wherein the first binder is one or more selected from the group consisting of polyethylene oxide (PEO), polyvinylidene fluoride (PVdF), and polyvinylidene fluoride-co-hexafluoropropylene (PVDF-HFP).

7. The method of claim 1, wherein the electrode active material is a positive electrode active material, and
   wherein, in the first and second mixing processes, the extruder is operated at a speed of from 30 rpm to 70 rpm under a temperature of from 20 to 60 degrees Celsius.

8. The method of claim 1, wherein the electrode active material is a negative electrode active material, and
   wherein, in the first and second mixing processes, the extruder is operated at a speed of from 30 rpm to 70 rpm under a temperature of from 80 to 120 degrees Celsius.

9. The method of claim 1, further comprising rolling the obtained electrode mixture to produce an electrode mixture in the form of a film having an average thickness of from 1 micrometer to 100 micrometers.

* * * * *